(12) United States Patent
Nesbit et al.

(10) Patent No.: US 12,439,577 B2
(45) Date of Patent: Oct. 7, 2025

(54) PICK AND PLACE SYSTEM

(71) Applicant: The Boeing Company, Chicago, IL (US)

(72) Inventors: Ashleigh Raoul Nesbit, Williamstown (AU); Andrew Klimovski, Melbourne (AU); Shaun McFetridge, Strathmore (AU); Johanna Austin, Melbourne (AU)

(73) Assignee: The Boeing Company, Chicago, IL (US)

( * ) Notice: Subject to any disclaimer, the term of this patent is extended or adjusted under 35 U.S.C. 154(b) by 1093 days.

(21) Appl. No.: 16/671,739

(22) Filed: Nov. 1, 2019

(65) Prior Publication Data

US 2021/0136969 A1 May 6, 2021

(51) Int. Cl.
| | |
|---|---|
| *B25J 15/06* | (2006.01) |
| *B25J 19/02* | (2006.01) |
| *G05B 19/418* | (2006.01) |
| *H05K 13/04* | (2006.01) |
| *H05K 13/08* | (2006.01) |

(52) U.S. Cl.
CPC ...... *H05K 13/0815* (2018.08); *B25J 15/0616* (2013.01); *B25J 19/02* (2013.01); *G05B 19/4182* (2013.01); *H05K 13/041* (2018.08); *G05B 2219/39107* (2013.01); *G05B 2219/45063* (2013.01)

(58) Field of Classification Search
CPC .............................. B25J 15/0616; B25J 19/02
See application file for complete search history.

(56) References Cited

U.S. PATENT DOCUMENTS

| | | | | |
|---|---|---|---|---|
| 3,467,430 A | * | 9/1969 | Henry ................... | C03B 23/245 294/188 |
| 4,389,064 A | * | 6/1983 | Laverriere .............. | B66C 1/025 428/136 |
| 5,154,561 A | * | 10/1992 | Lee ......................... | B63B 27/12 414/139.6 |
| 5,971,454 A | * | 10/1999 | Baan ...................... | B25B 11/005 294/87.1 |
| 6,341,808 B1 | * | 1/2002 | Baan ...................... | B65G 47/91 294/186 |
| 6,979,032 B2 | * | 12/2005 | Damhuis .............. | B65G 47/917 294/185 |

(Continued)

FOREIGN PATENT DOCUMENTS

| | | | | |
|---|---|---|---|---|
| DE | 202007000735 U1 | * | 4/2007 | ............ E04F 19/062 |
| JP | S6243723 B2 | * | 9/1987 | |
| WO | WO-2019058989 A1 | * | 3/2019 | ............ B25B 11/007 |

OTHER PUBLICATIONS

Composite Pick and Place. Accudyne Systems, Inc. [retrieved on Oct. 30, 2019]. Retrieved from the Internet: <URL:www.accudyne.com/composites-automation/composite-pick-and-place>. 3 pages.

*Primary Examiner* — Michael S Lowe
(74) *Attorney, Agent, or Firm* — Yee & Associates, P.C.

(57) ABSTRACT

A pick and place system and methods of use are presented. The pick and place system comprises a backing plate, a porous facesheet, and a flow generator. The backing plate is configured to direct air flow within the pick and place system. The porous facesheet is secured to the backing plate. The flow generator is configured to provide an air flow between the backing plate and the porous facesheet.

23 Claims, 14 Drawing Sheets

(56) References Cited

U.S. PATENT DOCUMENTS

| | | | |
|---|---|---|---|
| 9,381,651 B2* | 7/2016 | Ochiishi | B65G 49/061 |
| 10,118,805 B2* | 11/2018 | Mueller | B66C 1/0231 |
| 10,496,070 B2* | 12/2019 | Shapiro | B23K 37/0408 |
| 11,325,266 B1* | 5/2022 | Rodgers | B65G 47/918 |
| 2008/0089772 A1* | 4/2008 | Mueller-Hummel | B65G 47/91 |
| | | | 414/800 |
| 2020/0095001 A1* | 3/2020 | Menon | B25J 9/1687 |
| 2020/0164527 A1* | 5/2020 | Iwasaka | B25J 15/0683 |
| 2021/0275279 A1* | 9/2021 | Kofford | A61C 8/0001 |

* cited by examiner

PICK AND PLACE SYSTEM

BACKGROUND INFORMATION

1. Field

The present disclosure relates generally to positioning sheets of material and more specifically to a pick and place system and methods of using.

2. Background

Automated pick and place systems are used as automated handling solutions for composite materials, such as carbon fiber materials. Some conventional pick and place systems have a grid of suction cups attached to a vacuum table. The grid of suction cups is used to pick up a sheet of material and transport it to a desired position.

Uncured composite materials have a low stiffness. When transporting a sheet of material with low stiffness, such as an uncured composite material, the sheet of material may sag during transfer. To reduce sagging during transfer, conventional systems have increased a quantity of handling points by increasing a quantity of suction cups. However, some sagging may still occur with conventional pick and place systems.

Therefore, it would be desirable to have a method and apparatus that takes into account at least some of the issues discussed above, as well as other possible issues.

SUMMARY

An embodiment of the present disclosure provides a pick and place system. The pick and place system comprises a backing plate, a porous facesheet, and a flow generator. The backing plate is configured to direct air flow within the pick and place system. The porous facesheet is secured to the backing plate. The flow generator is configured to provide an air flow between the backing plate and the porous facesheet.

Another embodiment of the present disclosure provides a pick and place system. The pick and place system comprises a plurality of porous facesheets, a plurality of backing plates, and a number of flow generators. The plurality of porous facesheets is arranged into a facesheet assembly having a hold surface. The plurality of backing plates is configured to distribute air flow through each of the plurality of porous facesheets. The number of flow generators is configured to provide an air flow between the plurality of backing plates and the plurality of porous facesheets.

Yet another embodiment of the present disclosure provides a method. A porous facesheet of a pick and place system is placed relative to a sheet of material. Air flow is provided between a backing plate and the porous facesheet by a flow generator. The air flow is directed within the pick and place system by the backing plate. The air flow is drawn evenly through the porous facesheet. The sheet of material is picked up using the air flow through the porous facesheet.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that sagging is undesirable. The illustrative embodiments recognize and take into account that sagging can make accurate placement of the picked and placed material more difficult. The illustrative embodiments recognize and take into account that sagging is undesirable as the distance between the pick up points is less than the sagging material distance between these points.

The illustrative embodiments recognize and take into account that one way to reduce material sag would be to support the sheet of material over the entire surface without any unsupported locations. The illustrative embodiments recognize and take into account that one way to provide support to the sheet of material would be to utilize a large surface area vacuum pad rather than discrete location vacuum cups.

In some illustrative examples, other conventional pick and place systems have holes drilled into a plate at regular intervals to create a perforated surface. The small holes drilled into the plate act as mini vacuum cups, providing a large contact area to support the sheet of material. However, the drilled holes still act as discrete holding points. The drilled holes thus cause unsupported locations of the sheet of material. With drilled holes there may still be a sagging issue between the drilled holes. A perforated vacuum plate also presents imaging difficulties machine vision compensated system more difficult as the holes can appear to be the same color as the sheet of material being handled as seen below.

The illustrative embodiments use a porous facesheet to distribute vacuum. A porous material of the porous facesheet delivers a more even and distributed vacuum surface to support the sheet of material than discrete holding points. The illustrative embodiments provide reduced or eliminated sagging of the sheet of material.

Additionally, a porous facesheet provides a simpler visual backdrop than a perforated vacuum plate. A machine vision system that localizes the sheet of material performs a more accurate localization in conjunction with the pick and place system of the illustrative examples.

The illustrative examples are configured to provide both nearly entire material support as well as a more uniform backdrop for a machine vision compensation process. The pick and place system can be scaled by either replicating the unit cell including the porous facesheet or by scaling the porous facesheet.

Figure 1:
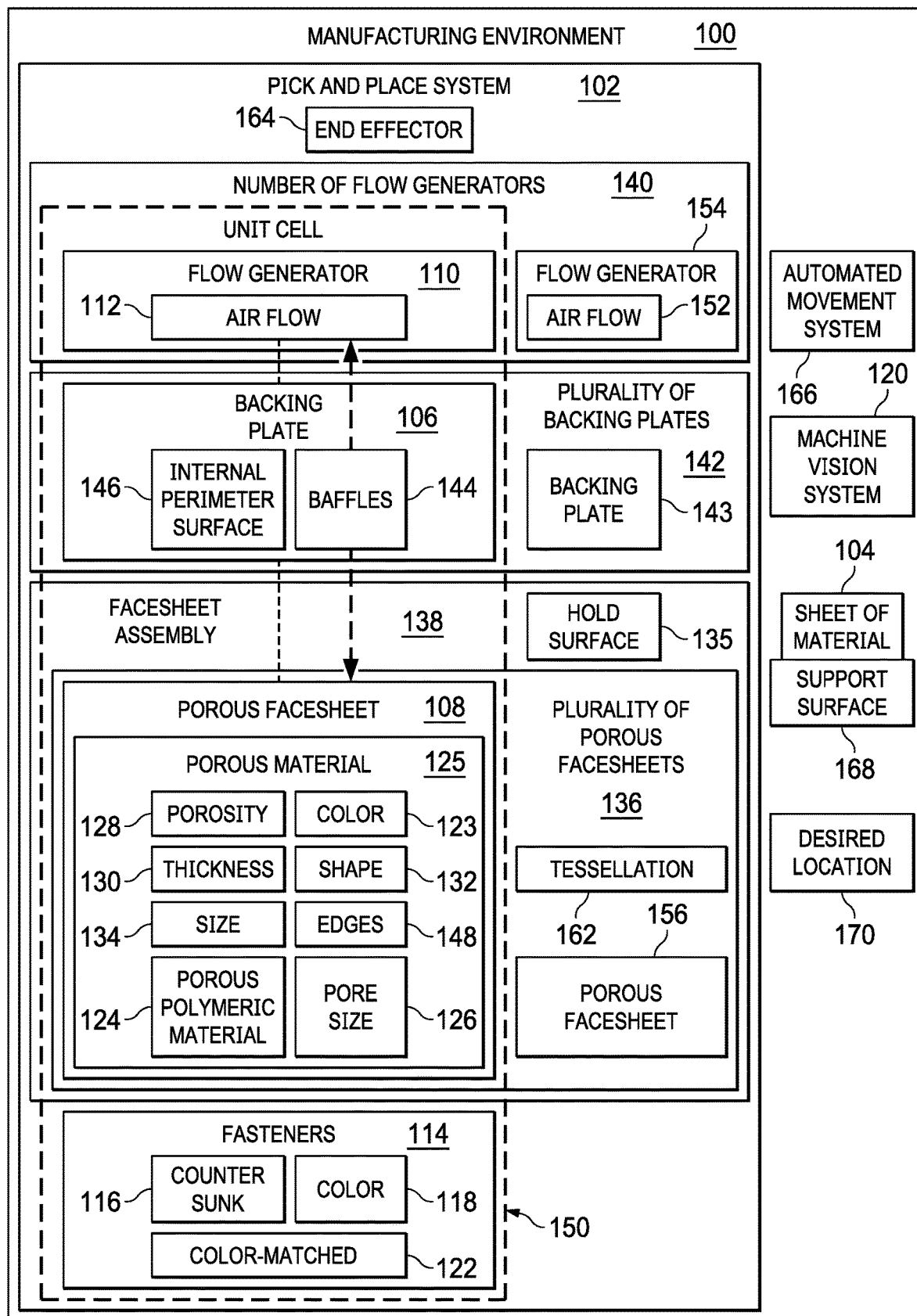
FIG. 1 is an illustration of a block diagram of a manufacturing environment in which an illustrative embodiment may be implemented.

Turning now to FIG. 1, an illustration of a block diagram of a manufacturing environment is depicted in which an illustrative embodiment may be implemented. Manufacturing environment 100 includes pick and place system 102 configured to pick up and place sheet of material 104.

Pick and place system 102 comprises backing plate 106, porous facesheet 108, and flow generator 110. Backing plate 106 is configured to direct air flow 112 within pick and place system 102. Porous facesheet 108 is secured to backing plate 106. Flow generator 110 is connected to backing plate 106 and configured to provide air flow 112 between backing plate 106 and porous facesheet 108. In some illustrative examples, porous facesheet 108 is formed of a flexible material. In some illustrative examples, porous facesheet 108 is substantially planar.

Porous facesheet 108 is secured to backing plate 106 in any desirable fashion. In some illustrative examples, porous facesheet 108 is bonded to backing plate 106. Porous facesheet 108 can be bonded using at least one of an adhesive, heat process, or pressure. Bonding porous facesheet 108 to backing plate 106 can be beneficial when using machine vision system 120 to localize sheet of material 104 on porous facesheet 108.

In some illustrative examples, porous facesheet 108 is secured to backing plate 106 by fasteners 114. In some illustrative examples, porous facesheet 108 is secured to backing plate 106 by fasteners 114 counter sunk 116 in porous facesheet 108. As fasteners 114 are counter sunk 116, hold surface 135 of pick and place system 102 is substantially flat. By being counter sunk 116, fasteners 114 will not undesirably impact material 104.

Fasteners 114 form locations on hold surface 135 of pick and place system 102 that do not provide air flow 112. Maintaining a low quantity of fasteners 114 maintains a low quantity of areas on hold surface 135 that do not provide air flow 112.

Fasteners 114 are formed out of any desirable material. The sheet of material of fasteners 114 is selected to not adversely interact with porous facesheet 108 or material 104 to be picked up by pick and place system 102. In some illustrative examples, fasteners 114 are formed of a polymeric material. Fasteners 114 have color 118 configured to be distinguished from material 104 to be picked up by pick and place system 102. Fasteners 114 have color 118 configured to distinguish fasteners 114 from material 104 by machine vision system 120. In some illustrative examples, fasteners 114 are color-matched 122 to porous facesheet 108. In some illustrative examples, when fasteners 114 are color-matched 122 to porous facesheet 108, color 118 is sufficiently close to color 123 of porous facesheet 108 such that machine vision system 120 does not identify fasteners 114 as different from porous facesheet 108.

Porous facesheet 108 is formed of porous material 125. Porous material 125 comprises a solid or foam matrix having pores permeating throughout. Porous material 125 can be referred to as a porous medium. Porous material 125 is an open cell material. The pores permeate throughout porous material 125 to all sides of porous facesheet 108.

Porous facesheet 108 is formed of any desirable type of porous material 125. In some illustrative examples, porous facesheet 108 is formed of a porous ceramic material, such as a sintering material. In some illustrative examples, porous facesheet 108 comprises porous polymeric material 124. Pore size 126, porosity 128, and thickness 130 affect air flow 112 through porous facesheet 108. Pore size 126 is a measure of the diameter of pores in porous facesheet 108. In some illustrative examples, porous facesheet 108 has pore size 126 in the range of 35 microns to 200 microns. Porosity 128 is a measure of the density of pores in porous facesheet 108. Increasing porosity 128 increases air flow 112 through porous facesheet 108. Porosity 128 is desirably as high as possible while maintaining structural support. In some illustrative examples, porous facesheet 108 has porosity 128 in the range of 10% to 60%. In some illustrative examples, porous facesheet 108 has porosity 128 in the range of 10% to 80%. In some illustrative examples, porous facesheet 108 has porosity 128 in the range of 20% to 70%. In some illustrative examples, porous facesheet 108 has porosity 128 in the range of 30% to 50%. In some illustrative examples, porous facesheet 108 has porosity 128 in the range of 30% to 40%. In some illustrative examples, porous facesheet 108 has porosity 128 in the range of 35% to 40%.

Thickness 130 affect air flow 112 through porous facesheet 108. Increasing thickness 130 increases a resistance to air flow 112. Thickness 130 is desirably as little as possible while maintaining structural support.

Porous facesheet 108 has any desirable shape 132 and size 134. In some illustrative examples, porous facesheet 108 has shape 132 and size 134 configured to contact an entire face of material 104. In these illustrative examples, porous facesheet 108 forms hold surface 135 of pick and place system 102 configured to hold material 104 during pick and place operations.

Hold surface 135 is formed in whole or in part by porous facesheet 108. In some illustrative examples, porous facesheet 108 is one of plurality of porous facesheets 136 forming facesheet assembly 138. In these illustrative examples, plurality of porous facesheets 136 forms hold surface 135 of pick and place system 102. In some of these illustrative examples, portions of hold surface 135 are individually controllable by selectively sending air flow to ones of plurality of porous facesheets 136. In some of these illustrative examples, number of flow generators 140 is pneumatically associated with plurality of porous facesheets 136 such that different flow generators of number of flow generators 140 are selectively activated to selectively draw air flow through facesheets of plurality of porous facesheets 136. As used herein, a "number of" items is one or more items. Thus, number of flow generators 140 is one or more flow generators.

In some illustrative examples, each of number of flow generators 140 is connected to only one backing plate of plurality of backing plates 142. Backing plate 106 is one of plurality of backing plates 142. In one example, flow generator 110 is connected to only backing plate 106. In some illustrative examples, at least one flow generator of number of flow generators 140 is connected to more than one backing plate of plurality of backing plates 142. In one example, flow generator 110 is connected to backing plate 106 and another backing plate of plurality of backing plates 142, such as backing plate 143. Porous facesheet 108 and backing plate 106 together work as a type of flow distribution manifold.

Backing plate 106 comprises baffles 144. Baffles 144 are configured to perform at least one function within pick and place system 102. In some illustrative examples, backing plate 106 comprises baffles 144 configured to direct air flow 112 through porous facesheet 108. Baffles 144 are configured to distribute air flow 112 across all of porous facesheet 108. In some illustrative examples, baffles 144 are inset from internal perimeter surface 146 of backing plate 106. By being inset from internal perimeter surface 146, baffles 144 allow air flow 112 to edges 148 of porous facesheet 108.

In some illustrative examples, baffles 144 are configured to support porous facesheet 108. In some illustrative examples, the height of baffles 144 is configured to support a face of porous facesheet 108.

In some illustrative examples, edges 148 of porous facesheet 108 extend past internal perimeter surface 146 of backing plate 106. When edges 148 of porous facesheet 108 extend past internal perimeter surface 146 of backing plate 106, thickness 130 of porous facesheet 108 is greater than a height of internal perimeter surface 146.

As depicted, backing plate 106, porous facesheet 108, and flow generator 110 are part of unit cell 150. In some illustrative examples, pick and place system 102 comprises multiple unit cells. In these illustrative examples, pick and place system 102 comprises plurality of porous facesheets 136, plurality of backing plates 142, and number of flow generators 140. In these illustrative examples, plurality of porous facesheets 136, plurality of backing plates 142, and number of flow generators 140 form the multiple unit cells. Plurality of porous facesheets 136 is arranged into facesheet assembly 138 having hold surface 135. Plurality of backing plates 142 is configured to distribute air flow through each of plurality of porous facesheets 136. As depicted, backing plate 106 is configured to distribute air flow 112 from flow generator 110 through porous facesheet 108. As depicted, backing plate 143 is configured to distribute air flow 152 from flow generator 154 through porous facesheet 156. Number of flow generators 140 is connected to plurality of backing plates 142. Number of flow generators 140 is connected to plurality of backing plates 142 by being at least one of pneumatically connected or structurally connected to plurality of backing plates 142.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

In some illustrative examples, each of number of flow generators 140 is connected to only one backing plate of plurality of backing plates 142. In one example, flow generator 110 is connected to only backing plate 106. In some illustrative examples, at least one flow generator of number of flow generators 140 is connected to more than one backing plate of plurality of backing plates 142. In some illustrative examples, flow generator 110 is connected to both backing plate 106 and backing plate 143.

Each of plurality of porous facesheets 136 has any desirable size and shape such that plurality of porous facesheets 136 is assembled to form hold surface 135. Porous facesheet 108 has size 134 and shape 132. Shape 132 is selected from a square, a triangle, a hexagon, a rectangle, or any other desirable type of shape that is capable of being tessellated.

In some illustrative examples, plurality of porous facesheets 136 forms tessellation 162. Tessellation 162 is an arrangement of plurality of porous facesheets 136 into rows and columns. In some illustrative examples in which plurality of porous facesheets 136 includes at least one shape that is not a square, the arrangement of plurality of porous facesheets 136 may be a regular arrangement that does not have discrete columns and rows. For example, if plurality of porous facesheets 136 includes a plurality of hexagonal porous facesheets, tessellation 162 is a hexagonal tessellation. As another example, if plurality of porous facesheets 136 includes a plurality of triangular porous facesheets, tessellation 162 is a triangular tessellation. In some illustrative examples, each of plurality of porous facesheets 136 has a same size and shape, and facesheet assembly 138 is tessellation 162.

Pick and place system 102 is end effector 164 configured to be connected to automated movement system 166. Automated movement system 166 takes any desirable form, such as a robotic arm, a gantry system, or other movement system.

During operation of pick and place system 102, porous facesheet 108 of pick and place system 102 is placed relative to sheet of material 104. Porous facesheet 108 is placed relative to sheet of material 104 by being placed in contact with sheet of material 104 or sufficiently near sheet of material 104 so that air flow 112 through porous facesheet 108 picks up sheet of material 104. Air flow 112 is drawn through porous facesheet 108. Sheet of material 104 is picked up and held using air flow 112 through porous facesheet 108. As depicted, sheet of material 104 is picked up from support surface 168.

In some illustrative examples, porous facesheet 108 has a curvature (not depicted) mirroring the curvature (not depicted) of support surface 168 holding sheet of material 104. In some illustrative examples, porous facesheet 402 and support surface 168 are substantially planar. In some illustrative examples, support surface 168 has a concave curvature (not depicted) and porous facesheet 402 has a convex curvature (not depicted). In some illustrative examples, support surface 168 has a convex curvature (not depicted) and porous facesheet 402 has a concave curvature (not depicted).

In some illustrative examples, porous facesheet 108 has substantially constant thickness 130. In these illustrative examples, an outer face (not depicted) and the opposite face, an inner face (not depicted), have the same curvature. In some illustrative examples, baffles 144 support porous facesheet 108 with an inner face having a complementary curvature to baffles 144.

Sheet of material 104 is localized on porous facesheet 108 using machine vision system 120. Sheet of material 104 is placed in desired location 170. In some illustrative examples, air flow 112 is ceased to release sheet of material 104 from porous facesheet 108. In some illustrative examples, air flow 112 is reversed to release sheet of material 104 from porous facesheet 108.

The illustration of pick and place system 102 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although only two porous facesheets are shown in plurality of porous facesheets 136 for illustrative purposes, plurality of porous facesheets 136 includes any desirable quantity of facesheets. As another example, although number of flow generators 140 is depicted as having a quantity of flow generators equal to a quantity of porous facesheets in plurality of porous facesheets 136, in other illustrative examples, number of flow generators 140 has fewer flow generators than porous facesheets in plurality of porous facesheets 136.

As another example, although not depicted, a securing means is present to secure porous facesheet 156 to backing plate 143. In some illustrative examples, porous facesheet 156 is bonded to backing plate 143. In some illustrative examples, fasteners connect porous facesheet 156 to backing plate 143. As yet another example, although porous facesheet 108 is depicted as one of plurality of porous facesheets 136, in some illustrative examples, porous facesheet 108 forms hold surface 135 without other facesheets. In these illustrative examples, porous facesheet 108 is scaled to a desirable size 134. In these illustrative examples, number of flow generators 140 includes only flow generator 110. In these illustrative examples, plurality of backing plates 142 is not present as only backing plate 106 is present in pick and place system 102.

In some illustrative examples, some adhesion of sheet of material 104 results from the lay up on support surface 168. In some illustrative examples, the adhesion of sheet of material 104 to support surface 168 is broken to some extent during the pick-up operation. In some illustrative examples, a peel off process is performed. In some illustrative examples, support surface 168 has pressure supplied between support surface 168 and sheet of material 104. Applying a positive air flow beneath sheet of material 104 releases sheet of material 104 from support surface 168.

Figure 2:
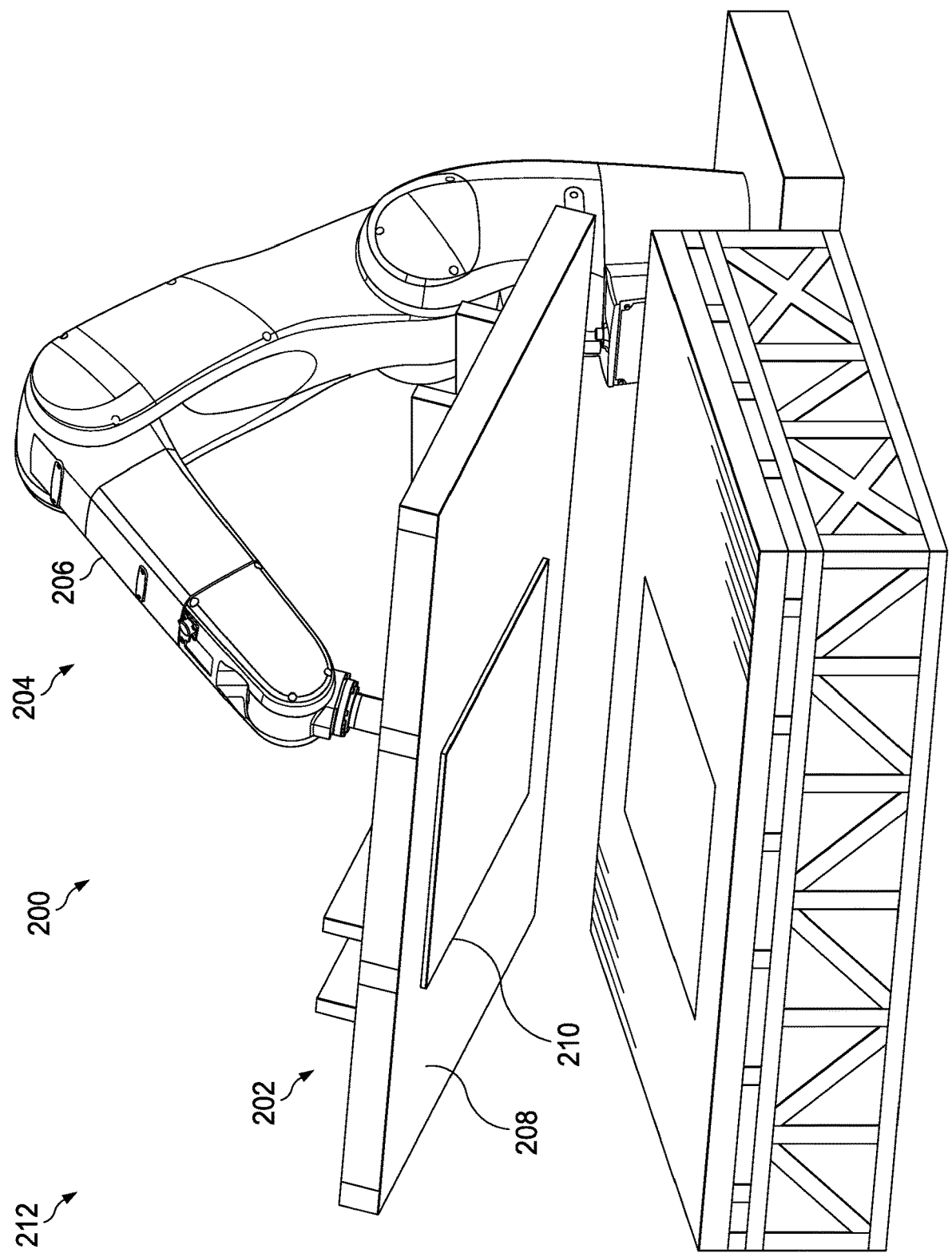
FIG. 2 is an illustration of a perspective view of a pick and place system in accordance with an illustrative embodiment.

Turning now to FIG. 2, an illustration of a perspective view of a pick and place system is depicted in accordance with an illustrative embodiment. Pick and place system 200 is a physical implementation of pick and place system 102 of FIG. 1. Pick and place system 200 takes the form of end effector 202. End effector 202 is configured to be connected to automated movement system 204. As depicted, automated movement system 204 takes the form of robotic arm 206.

Pick and place system 200 has hold surface 208. Hold surface 208 is formed by at least one porous facesheet, such as porous facesheet 108 of FIG. 1. In some illustrative examples, hold surface 208 is formed by a plurality of porous facesheets, such as plurality of porous facesheets 136 of FIG. 1.

As depicted, sheet of material 210 is held against hold surface 208 by an airflow through hold surface 208. In some illustrative examples, material 210 is a composite material. In view 212 pick and place system 200 holds material 210 over a desired location.

Figure 3:
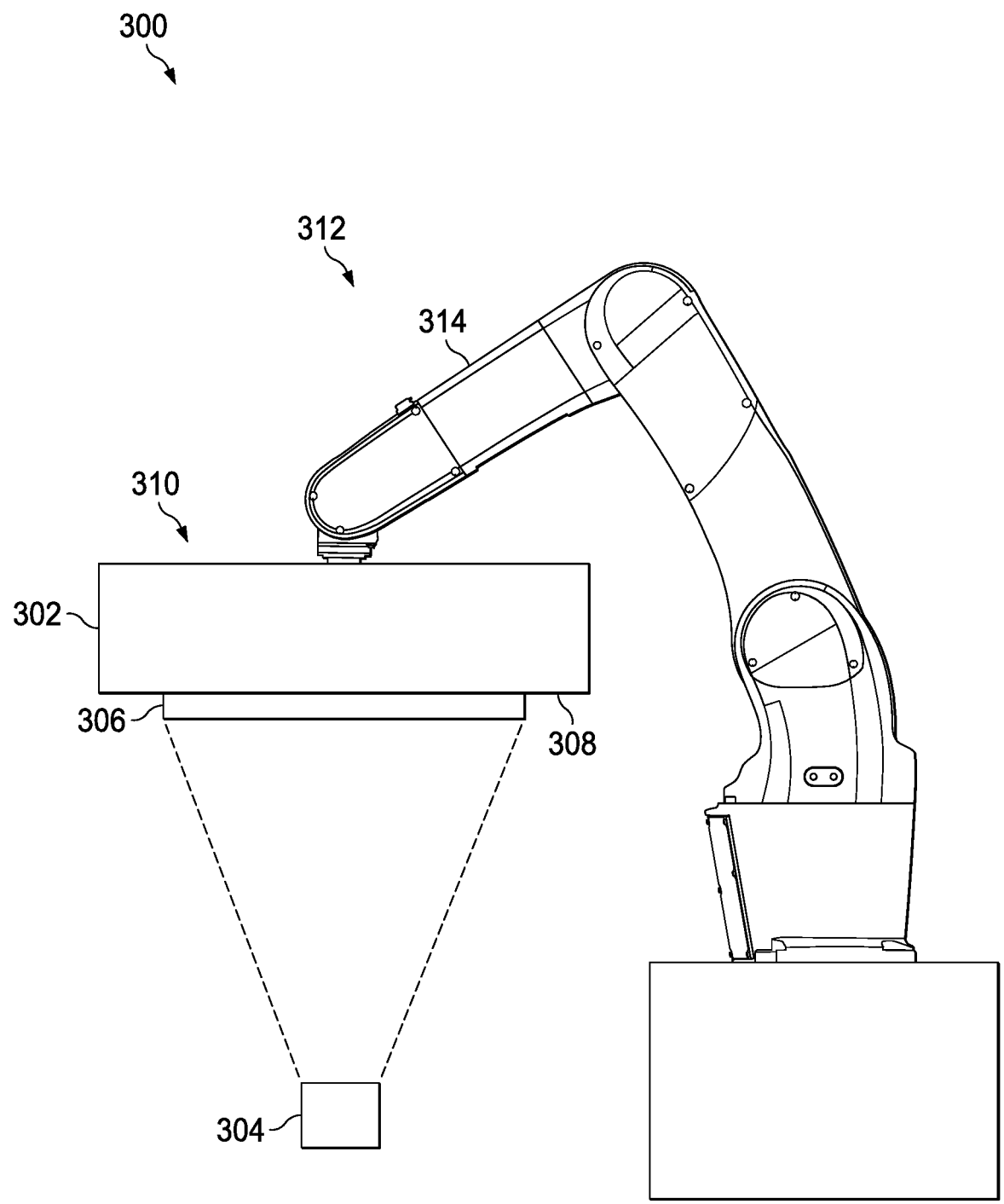
FIG. 3 is an illustration of a front view of a pick and place system with a machine vision system in accordance with an illustrative embodiment.

Turning now to FIG. 3, an illustration of a front view of a pick and place system with a machine vision system is depicted in accordance with an illustrative embodiment. View 300 may be a rough illustration of physical implementation of a pick and place system 102 and machine vision system 120 of FIG. 1. View 300 is a rough illustration of pick and place system 302 and machine vision system 304. View 300 is a view of machine vision system 304 verifying a location of material 306 on hold surface 308 of pick and place system 302. The dashed lines in view 300 extending from machine vision system 304 depict a field of view of machine vision system 304 encompassing hold surface 308. Pick and place system 302 is end effector 310 configured to be connected to automated movement system 312. Automated movement system 312 takes the form of robotic arm 314.

As depicted, machine vision system 304 is positioned beneath hold surface 308. In other illustrative examples, machine vision system 304 is positioned in any desirable location so that machine vision system 304 can image sheet of material 306 on hold surface 308. As depicted, machine vision system 304 and hold surface 308 are positioned relative to each other such that machine vision system 304 has a view perpendicular to hold surface 308. In other illustrative examples, machine vision system 304 is positioned at an angle relative to hold surface 308 such that machine vision system 304 has a view of hold surface 308. In some illustrative examples, machine vision system 304 is positioned relative to hold surface 308 such that machine vision system 304 has a view of all of hold surface 308. In some illustrative examples, machine vision system 304 is positioned relative to hold surface 308 such that machine vision system 304 has a view of a portion of hold surface 308, and at least one of machine vision system 304 and hold surface 308 is moved relative to the other to inspect all of hold surface 308.

Pick and place system 302 is designed to aid in localizing sheet of material 306 on pick and place system 302. Color of fasteners in pick and place system 302 aid in verifying location of material 306 on hold surface 308. The color of fasteners in pick and place system 302 is selected such that the fasteners are distinguished from material 306 by color. In some illustrative examples, the fasteners of pick and place system 302 are color-matched to hold surface 308.

Figure 4:
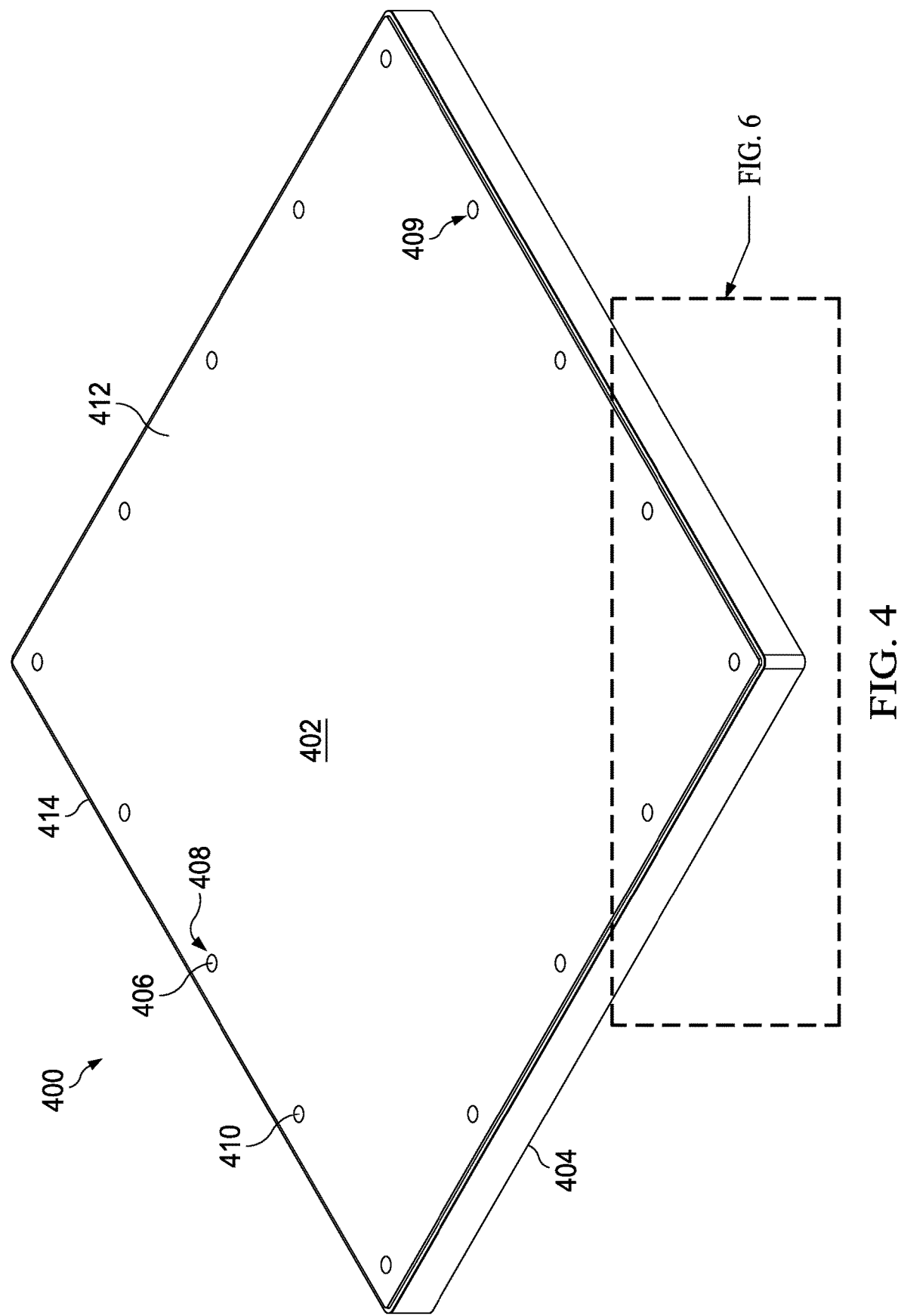
FIG. 4 is an illustration of a front perspective view of a unit cell of a pick and place system in accordance with an illustrative embodiment.

Turning now to FIG. 4, an illustration of a front perspective view of a unit cell of a pick and place system is depicted in accordance with an illustrative embodiment. Unit cell 400 is a physical implementation of unit cell 150 of FIG. 1. In some illustrative examples, unit cell 400 is one of a plurality of unit cells in pick and place system 200 of FIG. 2. In some illustrative examples, unit cell 400 is part of pick and place system 302 of FIG. 3.

Unit cell 400 includes porous facesheet 402 secured to backing plate 404. As depicted, porous facesheet 402 is secured to backing plate 404 by fasteners 406 counter sunk 408 in porous facesheet 402. To countersink fasteners 406 into porous facesheet 402, countersunk holes 409 are made in porous facesheet 402.

Fasteners 406 are counter sunk 408 to maintain a substantially flat hold surface. In some illustrative examples, porous facesheet 402 forms a hold surface by itself. In some illustrative examples, porous facesheet 402 forms a portion of a hold surface.

Fasteners 406 have color 410 configured to be distinguished from material to be picked up by a pick and place system containing unit cell 400. Fasteners 406 have color 410 configured to distinguish fasteners 406 from the sheet of material to be picked up by a machine vision system.

As depicted, fasteners 406 are color-matched to porous facesheet 402. Because fasteners 406 are color-matched to porous facesheet 402, color 410 is sufficiently close to color 412 of porous facesheet 402 such that a machine vision system does not identify fasteners 406 as different from porous facesheet 402.

As depicted, fasteners 406 extend around perimeter 414 of porous facesheet 402. A quantity of fasteners 406 is selected to hold porous facesheet 402 to backing plate 404 without undesirably affecting the air flow through porous facesheet 402. Fasteners 406 extend around perimeter 414 but inset from internal perimeter surface to allow for distribution of air flow to perimeter 414. The internal perimeter surface can be seen more clearly in FIG. 6, internal perimeter surface 604. In other illustrative examples, fasteners 406 has at least one of a different quantity or a different location in porous facesheet 402.

Figure 5:
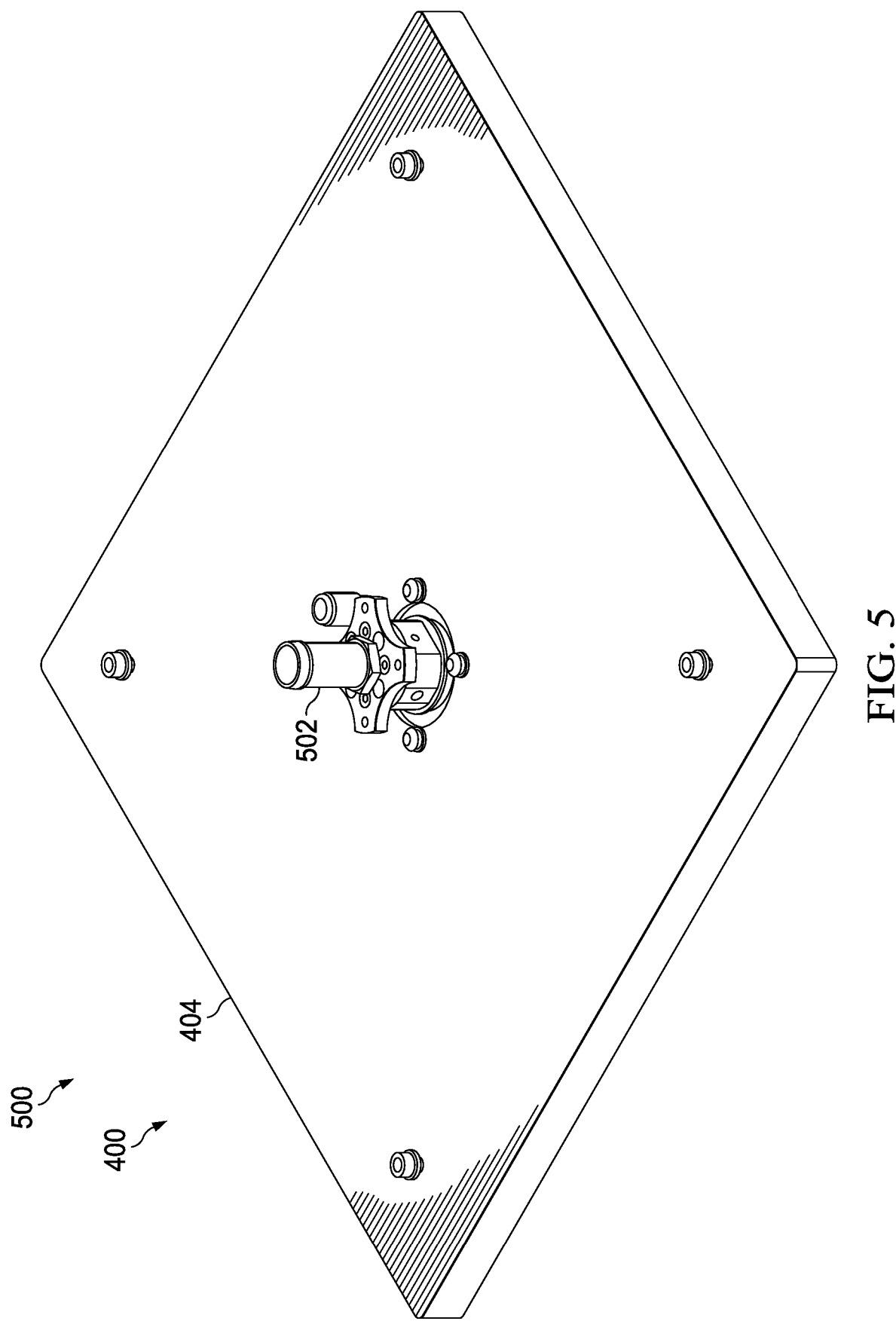
FIG. 5 is an illustration of a back perspective view of a unit cell of a pick and place system in accordance with an illustrative embodiment.

Turning now to FIG. 5, an illustration of a back perspective view of a unit cell of a pick and place system is depicted in accordance with an illustrative embodiment. View 500 is a back view of unit cell 400 of FIG. 4.

Unit cell 400 has flow generator 502 connected to backing plate 404. Backing plate 404 is configured to direct air flow within unit cell 400. Flow generator 502 is connected to backing plate 404 and configured to provide air flow between backing plate 404 and porous facesheet 402 of FIG. 4. Air flow is sent directly from flow generator 502 into backing plate 404. Backing plate 404 distributes the air flow from flow generator 502 to porous facesheet 402 of FIG. 4.

Figure 6:
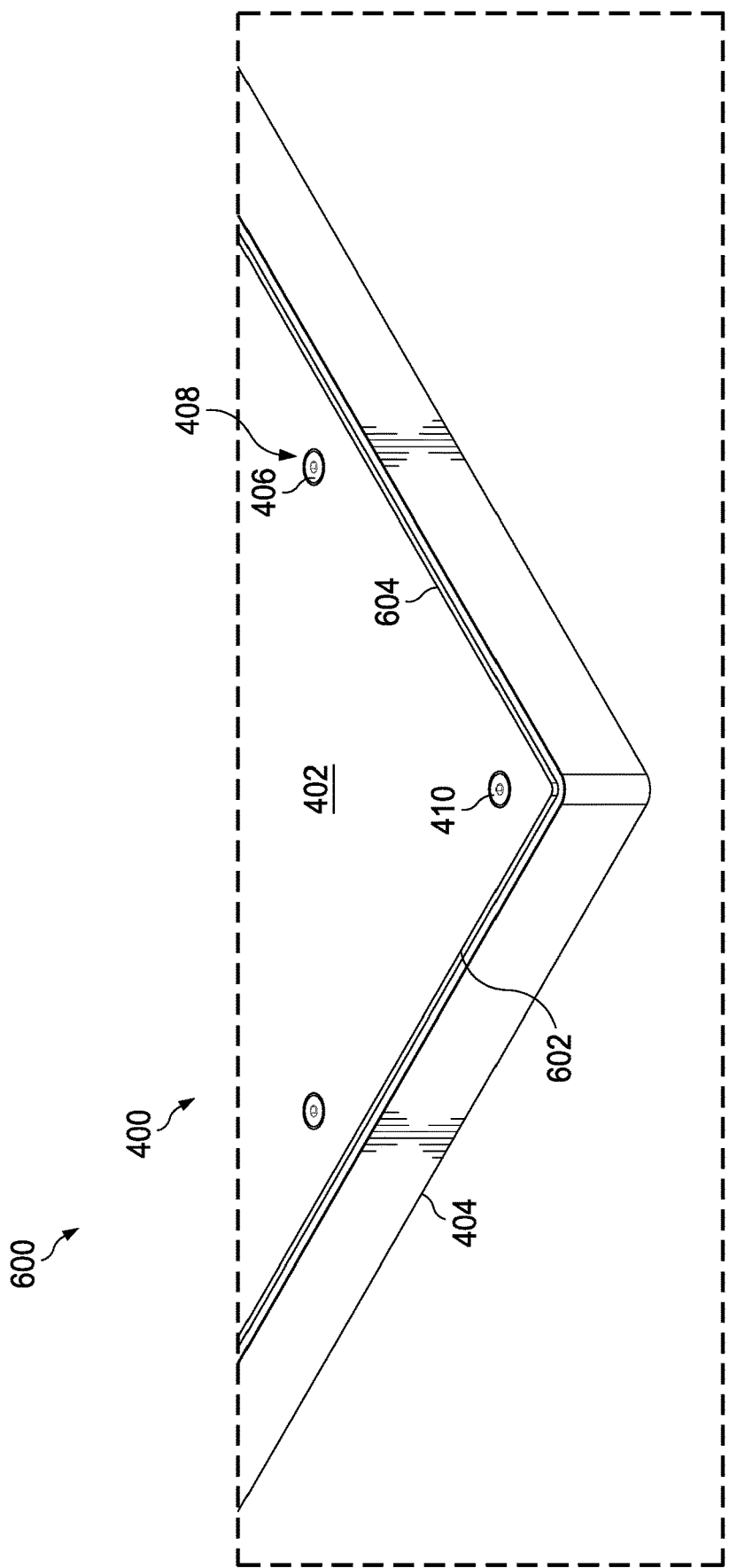
FIG. 6 is an illustration of a front perspective view of a portion of a unit cell of a pick and place system in accordance with an illustrative embodiment.

Turning now to FIG. 6, an illustration of a front perspective view of a portion of a unit cell of a pick and place system is depicted in accordance with an illustrative embodiment. View 600 is a view within box 6 of FIG. 4. As depicted, edges 602 of porous facesheet 402 extend past internal perimeter surface 604 of backing plate 404. Edges 602 extend upward past internal perimeter surface 604 of backing plate 404. By edges 602 of porous facesheet 402 extending past internal perimeter surface 604, portions of edges 602 are exposed.

Figure 7:
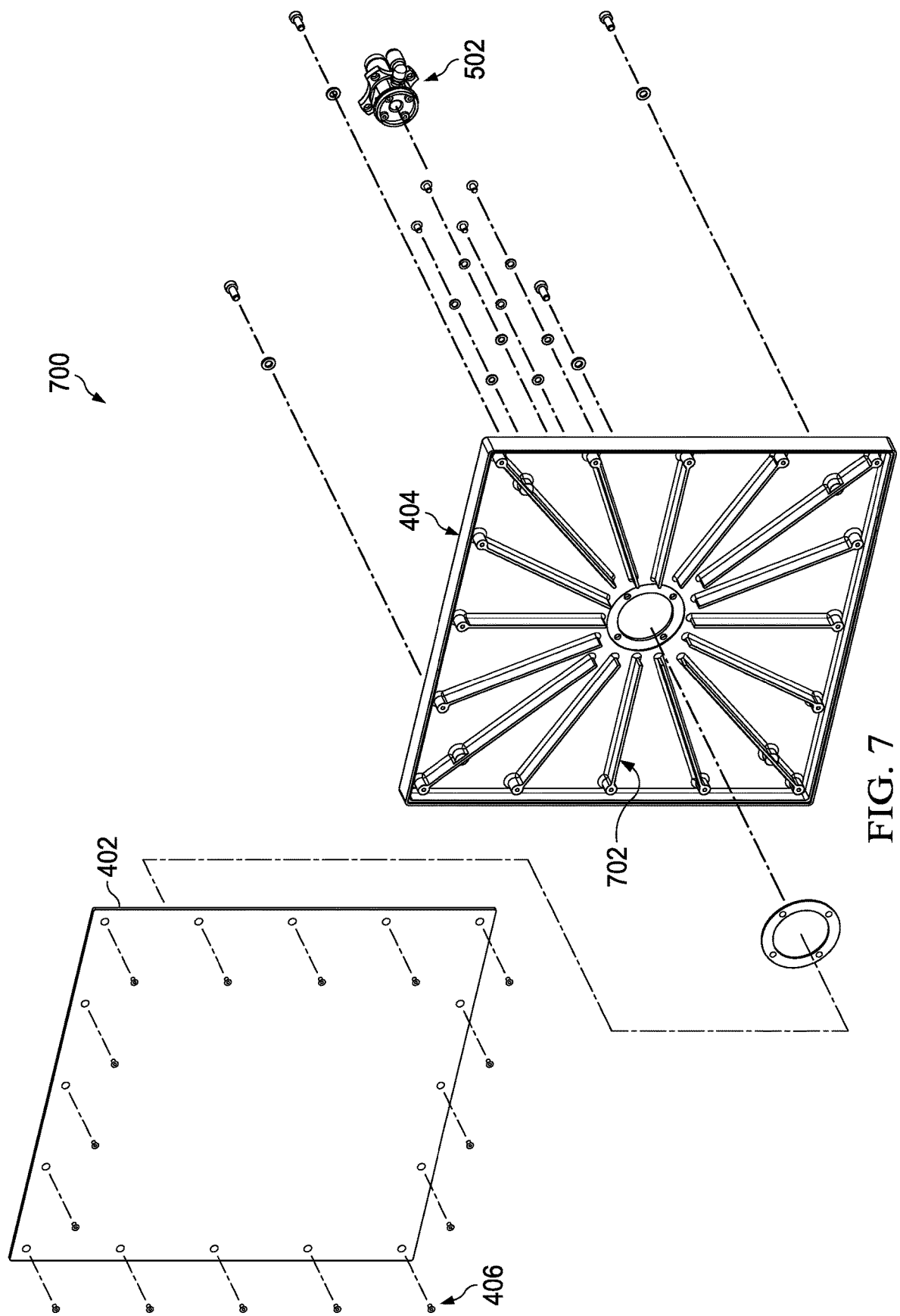
FIG. 7 is an illustration of an exploded perspective view of a unit cell of a pick and place system in accordance with an illustrative embodiment.

Turning now to FIG. 7, an illustration of an exploded perspective view of a unit cell of a pick and place system is depicted in accordance with an illustrative embodiment. View 700 is an exploded view of unit cell 400 of FIG. 4.

In exploded view 700, fasteners 406, porous facesheet 402, backing plate 404, and flow generator 502 are visible. In view 700, baffles 702 of backing plate 404 are visible.

Backing plate 404 is used to hold porous facesheet 402 and provide a vacuum path. The vacuum path (no reference number) extends across the interior of backing plate 404 between baffles 702. Backing plate 404 comprises baffles 702 configured to provide multiple functions for unit cell 400. Baffles 702 aid in flow distribution for the air flow to porous facesheet 402. Baffles 702 are configured to direct air flow through porous facesheet 402. Baffles 702 create the vacuum path within unit cell 400.

In some illustrative examples, baffles 702 are configured to support porous facesheet 402. Baffles 702 provide mechanical support to porous facesheet 402. In some illustrative examples, baffles 702 stiffen porous facesheet 402. In some illustrative examples, baffles 702 provide support to porous facesheet 402 to provide a substantially flat surface to a material to be picked up by the pick and place system including unit cell 400. In some illustrative examples, baffles 702 provide support to porous facesheet 402 to provide a surface having a desired contour to a material to be picked up by the pick and place system including unit cell 400. In some illustrative examples, baffles 702 provide a counter force to the air flow from flow generator 502.

As depicted, porous facesheet 402 has a substantially constant thickness. In these illustrative examples, outer face 704 and the opposite face, inner face 706, have the same curvature. In some illustrative examples, baffles 702 support porous facesheet 402 with inner face 706 having a complementary curvature to baffles 702. As depicted, porous facesheet 402 is substantially planar. In other non-depicted examples, porous facesheet 402 has a curvature configured to mirror the curvature of a support surface holding a sheet of material, such as support surface 168 holding sheet of material 104. In some non-depicted examples, porous facesheet 402 has a convex curvature. In some non-depicted examples, porous facesheet 402 has a concave curvature.

As depicted, flow generator 502 takes the form of a commercial off the shelf vacuum generator that consumes compressed air. In other illustrative examples, flow generator 502 can be another type, another size, or another strength of vacuum source.

Figure 8:
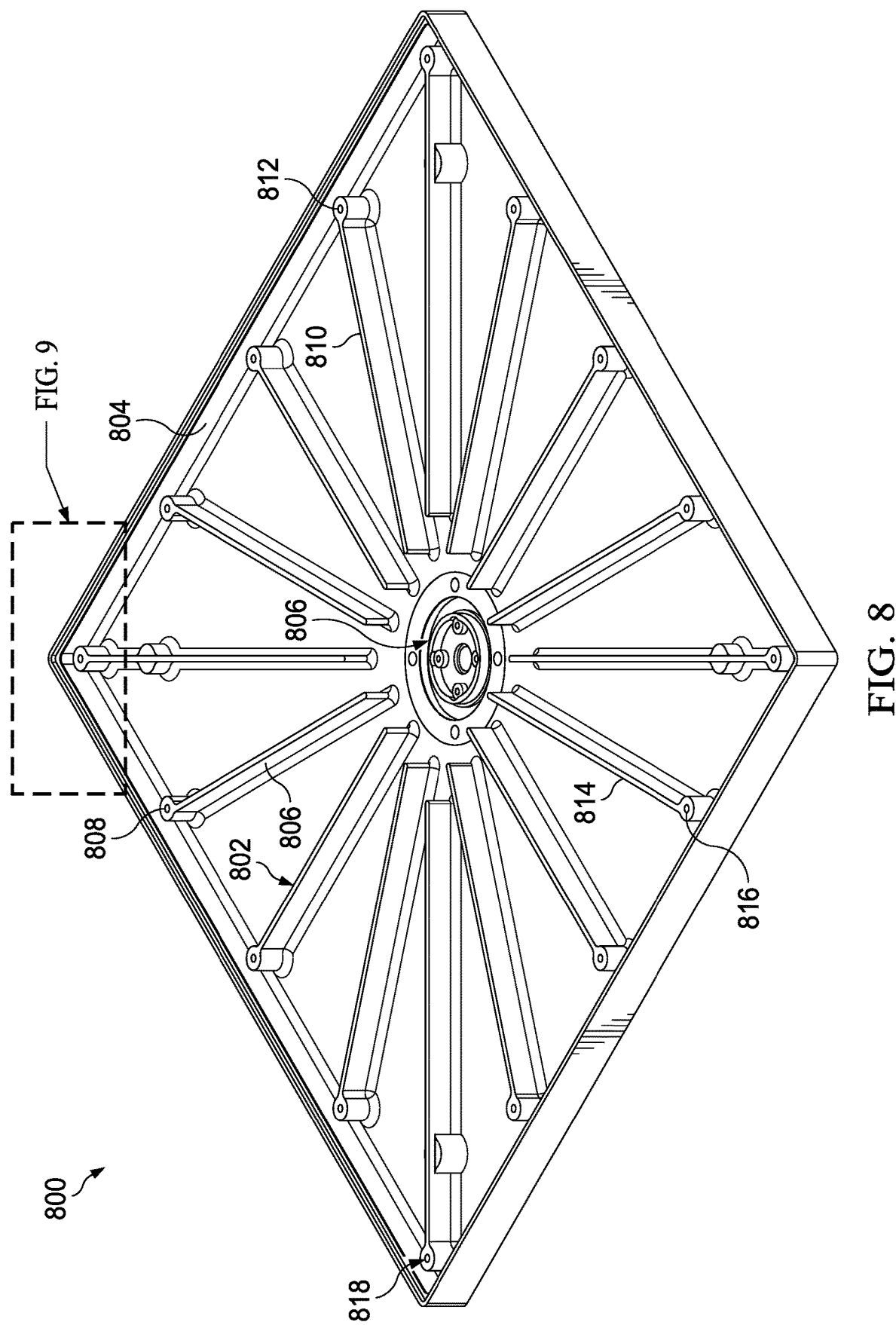
FIG. 8 is an illustration of a front perspective view of a backing plate of a unit cell of a pick and place system in accordance with an illustrative embodiment.

Turning now to FIG. 8, an illustration of a front perspective view of a backing plate of a unit cell of a pick and place system is depicted in accordance with an illustrative embodiment. Backing plate 800 is a physical implementation of backing plate 106 of FIG. 1. Backing plate 800 may be the same as backing plate 404 of unit cell 400 of FIG. 4. Backing plate 800 is configured to direct air flow within a pick and place system. Backing plate 800 comprises baffles 802 configured to direct airflow through a porous facesheet, such as porous facesheet 402 of FIGS. 4-7. Baffles 802 are configured to provide multiple functions for a unit cell, such as unit cell 400 of FIGS. 4-7. Baffles 802 are also configured to support the porous facesheet. Baffles 802 are configured to provide material support to the surface of a porous facesheet facing baffles 802.

In some illustrative examples, baffles 802 support a porous facesheet with an inner face having a complementary curvature to baffles 802. In some illustrative examples, the thickness of the porous facesheet is substantially constant. In these illustrative examples, an outer face and an opposite, inner face of the porous facesheet have the same curvature.

As depicted, baffles 802 are inset from internal perimeter surface 804 of backing plate 800. In this illustrative example, each of baffles 802 has a respective receiver for a fastener. For example, baffle 806 has receiver 808, baffle 810 has receiver 812, and baffle 814 has receiver 816. As depicted, each of receivers 818 is threaded to receive a threaded fastener. Each of receivers 818 is separated from internal perimeter surface 804 by a respective gap.

As depicted, baffles 802 end prior to air flow inlet 820. Air flow from a flow generator, such as flow generator 502 of FIG. 5, enters backing plate 800 at air flow inlet 820. Air flow is directed by baffles 802 from air flow inlet 820 to internal perimeter surface 804.

Figure 9:
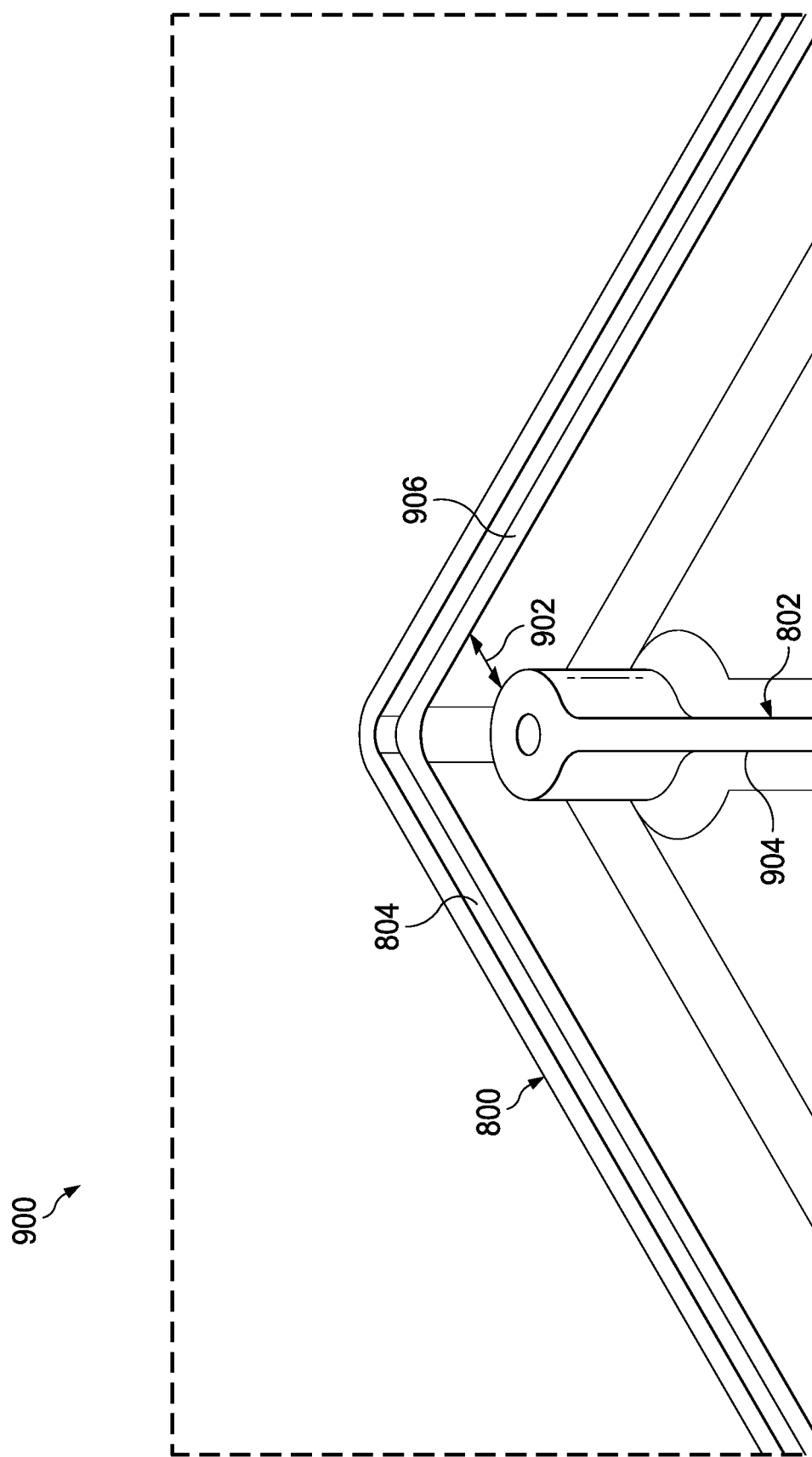
FIG. 9 is an illustration of a front perspective view of a portion of a backing plate of a unit cell of a pick and place system in accordance with an illustrative embodiment.

Turning now to FIG. 9, an illustration of a front perspective view of a portion of a backing plate of a unit cell of a pick and place system is depicted in accordance with an illustrative embodiment. View 900 is a view within the box labeled FIG. 9 within FIG. 8. In view 900, gap 902 between baffle 904 of baffles 802 and internal perimeter surface 804 is visible. In view 900, support ledge 906 of backing plate 800 is visible. Support ledge 906 supports an underside of a porous facesheet, such as porous facesheet 402 of FIG. 4. The porous nature of a porous facesheet, such as porous facesheet 402 would allow vacuum to be drawn above the baffle due to migration through the porous facesheet.

The illustrations of unit cell 400 in FIGS. 4-7 and backing plate 800 in FIGS. 8-9 are not meant to imply physical or architectural limitations to the manner in which an illustrative embodiment may be implemented. Other components in addition to or in place of the ones illustrated may be used. Some components may be unnecessary.

For example, although unit cell 400 is depicted as having fasteners 406 securing porous facesheet 402 to backing plate 404, porous facesheet 402 is secured to backing plate 404 in any desirable fashion. In some illustrative examples, porous facesheet 402 has a different type of mechanical fasteners.

In some illustrative examples, porous facesheet 402 is bonded to backing plate 404. Porous facesheet 402 can be bonded using at least one of an adhesive, heat process, or pressure. Bonding porous facesheet 402 to backing plate 404 can be beneficial when using a machine vision system to localize a sheet of material on porous facesheet 402.

During application of an air flow (not depicted) through porous facesheet 402, baffles 702 provide support to porous facesheet 402 in a direction opposite the air flow (not depicted). The air flow (not depicted) provides a pulling force on porous facesheet 402 towards backing plate 404. Baffles 702 provide a counter force to the air flow from flow generator 502.

As another example, baffles 802 have any desirable shape or quantity. In some illustrative examples, at least one baffle of baffles 802 does not have a respective receiver.

Figure 10:
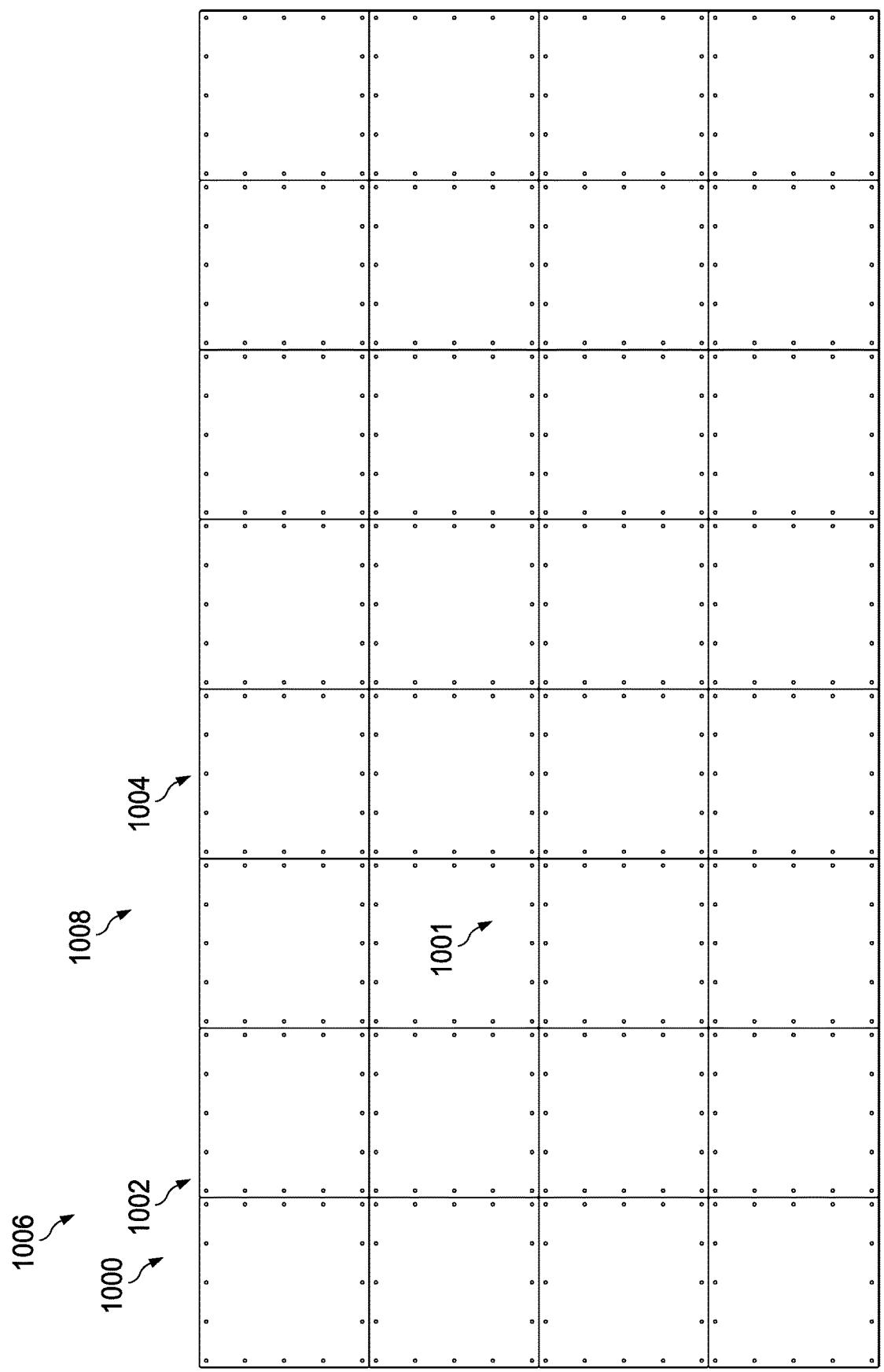
FIG. 10 is an illustration of a front view of a plurality of porous facesheets arranged in a tessellation in a pick and place system in accordance with an illustrative embodiment.

Turning now to FIG. 10, an illustration of a front view of a plurality of porous facesheets arranged in a tessellation in a pick and place system is depicted in accordance with an illustrative embodiment. Plurality of porous facesheets 1000 is a physical implementation of plurality of porous facesheets 136 of FIG. 1. In some illustrative examples, plurality of porous facesheets 1000 form hold surface 208 of FIG. 2. In some illustrative examples, porous facesheet 402 of unit cell 400 of FIGS. 4-7 is one porous facesheet of plurality of porous facesheets 1000. Plurality of porous facesheets 1000 form hold surface 1001.

As depicted, each of plurality of porous facesheets 1000 has a same size and shape. As depicted, each of plurality of porous facesheets 1000 is a square. In other illustrative examples, each of plurality of porous facesheets 1000 has any desirable shape, such as rectangular, triangular, hexagonal, or any other desirable shape that is capable of being tessellated.

As depicted, plurality of porous facesheets 1000 is arranged to form tessellation 1002. As depicted, tessellation 1002 is an arrangement of plurality of porous facesheets 1000 into rows and columns. In some illustrative examples in which plurality of porous facesheets 1000 includes at least one shape that is not a square, the arrangement of plurality of porous facesheets 1000 may be a regular arrangement that does not have discrete columns and rows. For example, if plurality of porous facesheets 1000 includes a plurality of hexagonal porous facesheets, the tessellation is a hexagonal tessellation. As another example, if plurality of porous facesheets 1000 includes a plurality of triangular porous facesheets, the tessellation is a triangular tessellation.

Plurality of porous facesheets 1000 are part of plurality of unit cells 1004. Plurality of unit cells 1004 include a plurality of backing plates and at least one vacuum source that are not visible in view 1006. View 1006 is a front view of pick and place system 1008 configured to be connected to an automated movement system.

Figure 11:
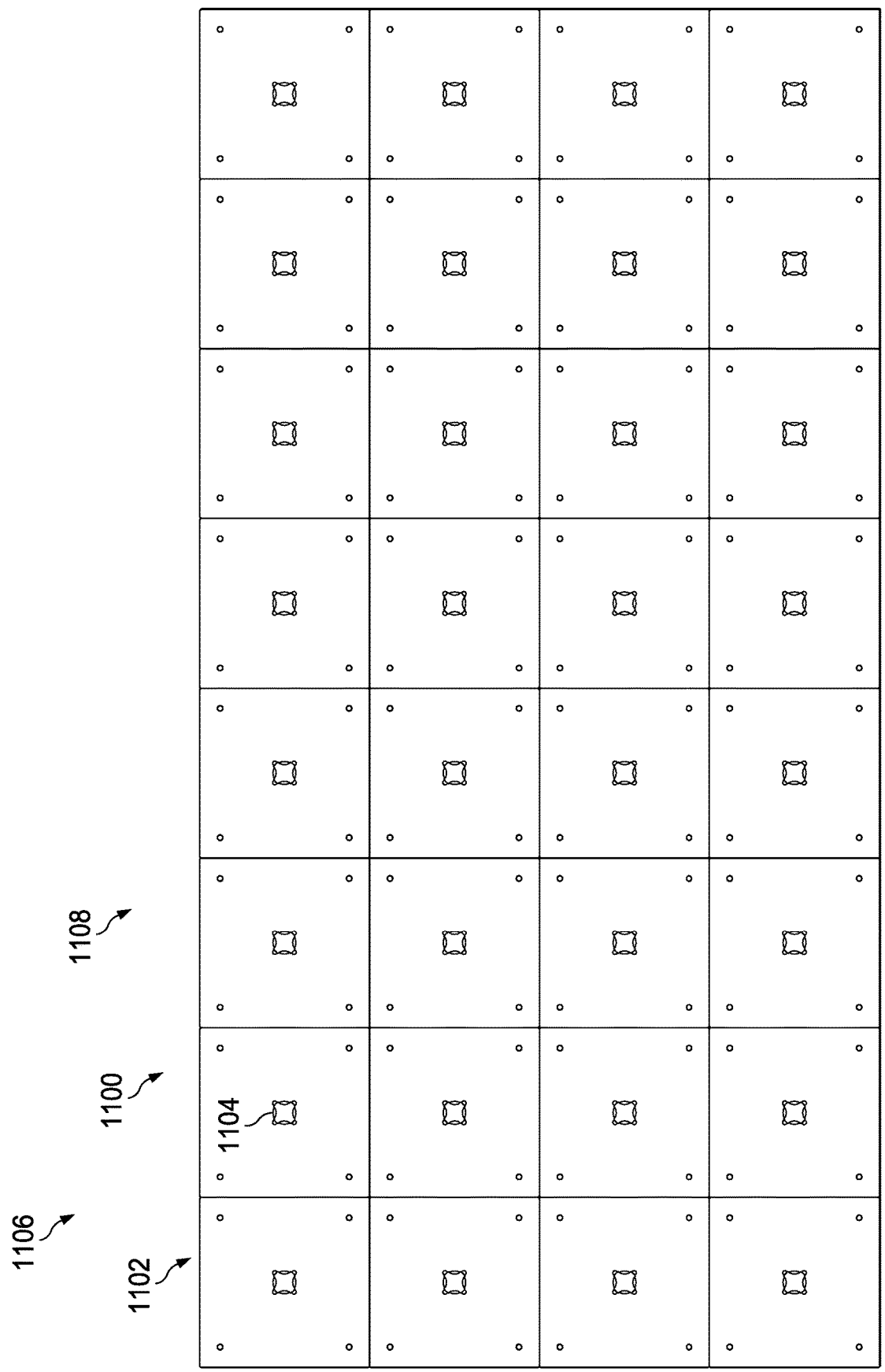
FIG. 11 is an illustration of a back view of a plurality of porous facesheets arranged in a tessellation in a pick and place system in accordance with an illustrative embodiment.

Turning now to FIG. 11, an illustration of a back view of a plurality of porous facesheets arranged in a tessellation in a pick and place system is depicted in accordance with an illustrative embodiment. In some illustrative examples, plurality of unit cells 1100 is the same as plurality of unit cells 1004 of FIG. 10. In these illustrative examples, plurality of backing plates 1102 is an implementation of a plurality of backing plates of plurality of unit cells 1004. Plurality of unit cells 1100 is a physical implementation of plurality of backing plates 142 and number of flow generators 140 of FIG. 1. View 1106 is a back view of pick and place system 1108 configured to be connected to an automated movement system.

Plurality of unit cells 1100 includes number of flow generators 1104. Number of flow generators 1104 are configured to provide air flow to a plurality of porous facesheets of plurality of unit cells 1100. As depicted, each of number of flow generators 1104 is connected to only one backing plate of plurality of backing plates 1102. In this illustrative example, air flow to each unit cell of plurality of unit cells 1100 is individually controlled. In some illustrative examples, only selected unit cells of plurality of unit cells 1100 are activated to pick up a sheet of material depending upon a shape and size of the sheet of material. In these illustrative examples, drawing an air flow through a porous facesheet comprises pulling flow through a subset of the plurality of porous facesheets. In some illustrative examples, all unit cells of plurality of unit cells 1100 are activated regardless of a size and shape of a sheet of material to be picked up.

Figure 12:
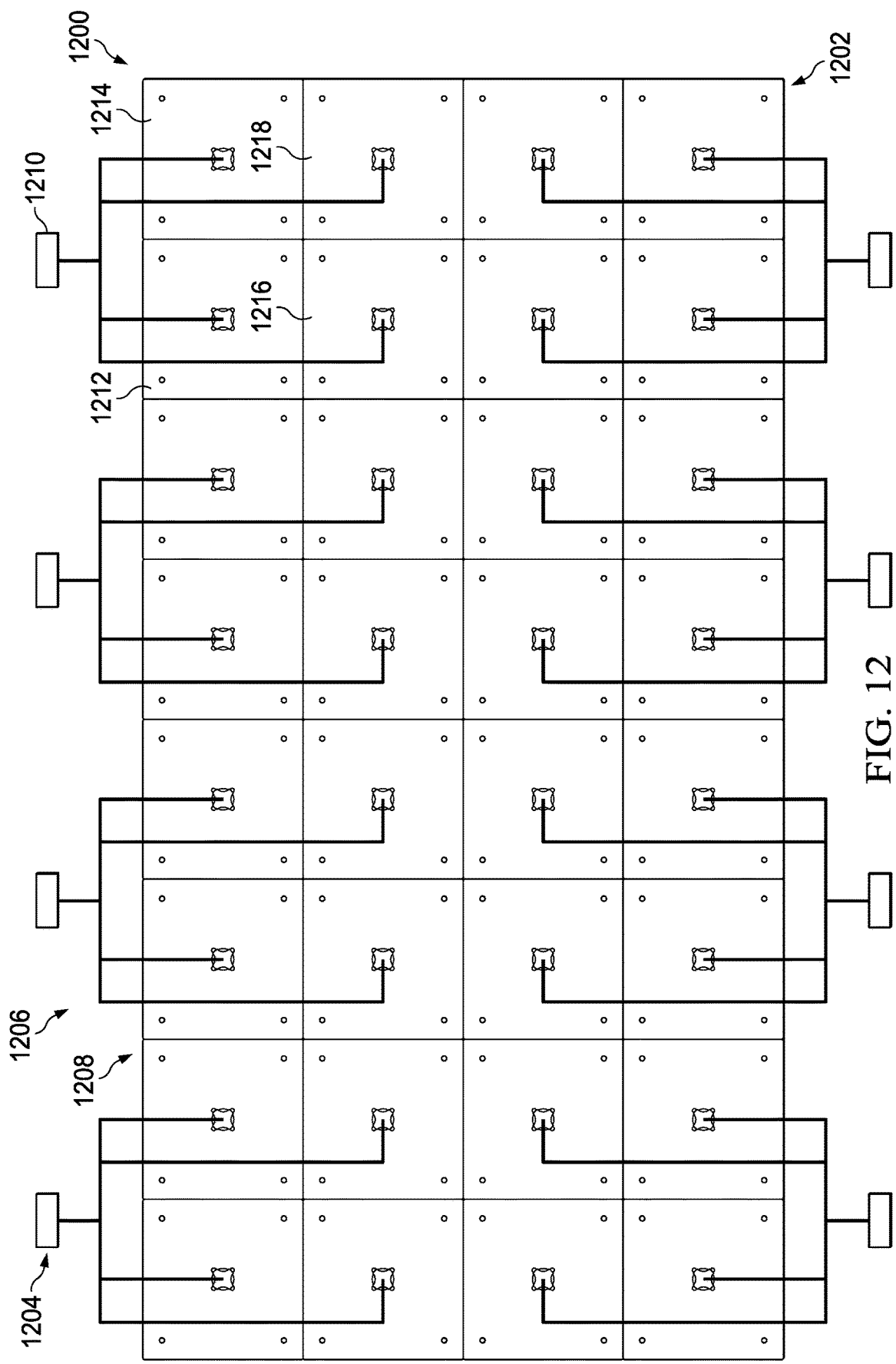
FIG. 12 is an illustration of a back view of a plurality of porous facesheets arranged in a tessellation in a pick and place system in accordance with an illustrative embodiment.

Turning now to FIG. 12, an illustration of a back view of a plurality of porous facesheets arranged in a tessellation in a pick and place system is depicted in accordance with an illustrative embodiment. In some illustrative examples, plurality of unit cells 1200 is the same as plurality of unit cells 1004 of FIG. 10. In these illustrative examples, plurality of backing plates 1202 is an implementation of a plurality of backing plates of plurality of unit cells 1004 of FIG. 10. Plurality of unit cells 1200 is a physical implementation of plurality of backing plates 142 and number of flow generators 140 of FIG. 1. View 1206 is a back view of pick and place system 1208 configured to be connected to an automated movement system.

Plurality of unit cells 1200 includes number of flow generators 1204. Number of flow generators 1204 is configured to provide air flow to a plurality of porous facesheets of plurality of unit cells 1200. In this illustrative example, at least one flow generator of number of flow generators 1204 is connected to more than one backing plate of plurality of backing plates 1202. For example, flow generator 1210 of number of flow generators 1204 is connected to backing plate 1212, backing plate 1214, backing plate 1216, and backing plate 1218.

In this illustrative example, air flow is provided to multiple unit cells by each flow generator of number of flow generators 1204. In this illustrative example, multiple unit cells are activated together. In some illustrative examples, only selected unit cells of plurality of unit cells 1200 are activated to pick up a sheet of material depending upon a shape and size of the sheet of material. In some illustrative examples, all unit cells of plurality of unit cells 1200 are activated regardless of a size and shape of a sheet of material to be picked up.

The illustrations of pick and place system 1008 in FIG. 10, pick and place system 1108 in FIG. 11, and pick and place system 1208 in FIG. 12 are not meant to imply physical or architectural limitations to the manner in which an illustrative embodiment may be implemented. Other components in addition to or in place of the ones illustrated may be used. Some components may be unnecessary. In some illustrative examples, additional air flow controls or modulators (not depicted) are present between each flow generator of number of flow generators 1204 and plurality of unit cells 1200.

Figure 13:
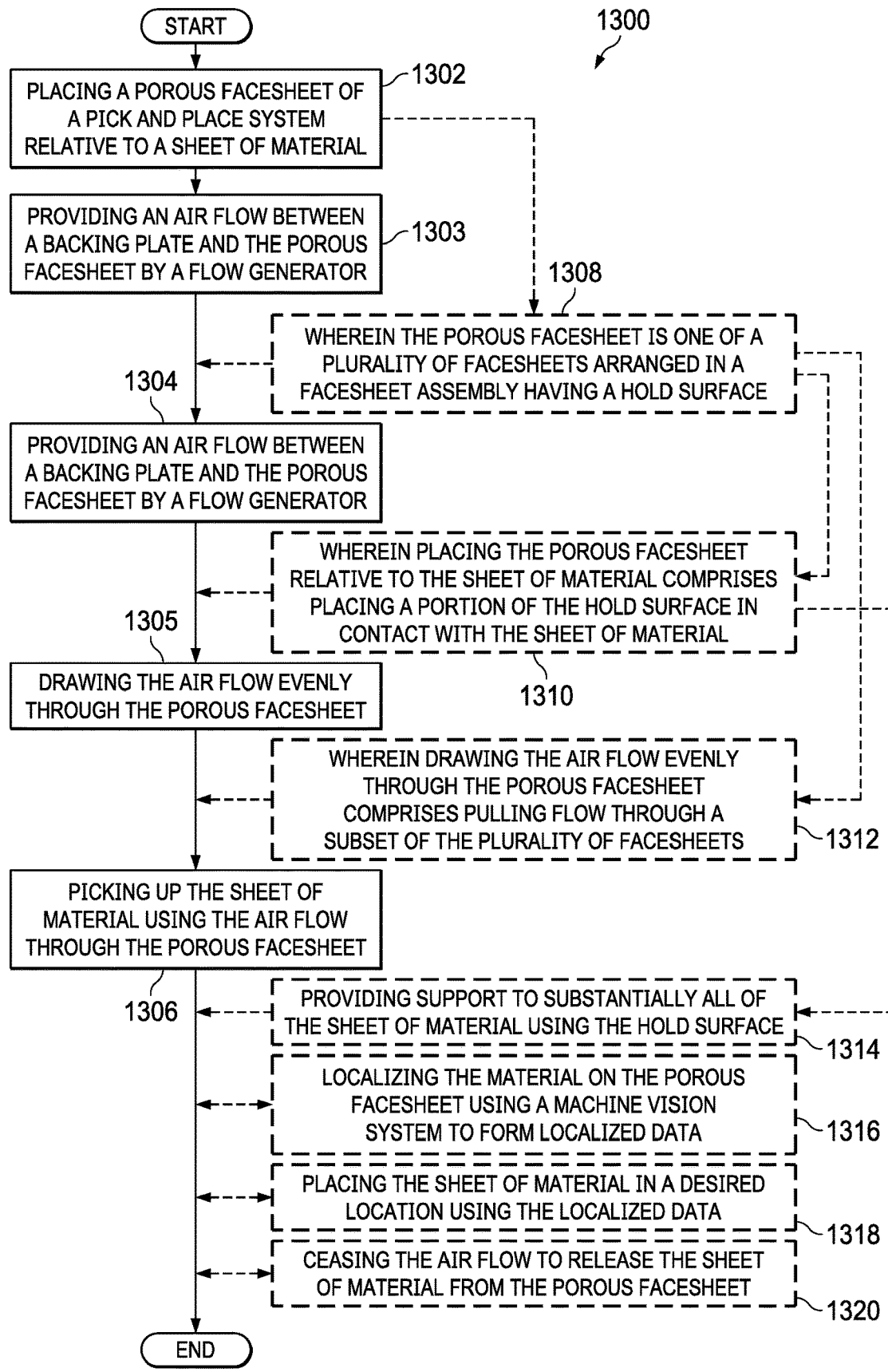
FIG. 13 is an illustration of a flowchart of a method of using a pick and place machine in accordance with an illustrative embodiment.

Turning now to FIG. 13, an illustration of a flowchart of a method of using a pick and place machine is depicted in accordance with an illustrative embodiment. Method 1300 may be implemented using pick and place system 102 of FIG. 1. Method 1300 may be implemented using pick and place system 200 of FIG. 2. Method 1300 may be implemented using pick and place system 302 of FIG. 3. Method 1300 may be implemented using a pick and place system having unit cell 400 of FIGS. 4-7. Method 1300 may be implemented using a pick and place system having backing plate 800 of FIGS. 8-9. Method 1300 may be implemented using pick and place system 1008 having hold surface 1001 of FIG. 10. Method 1300 may be implemented using pick and place system 1108 of FIG. 11. Method 1300 may be implemented using pick and place system 1208 of FIG. 12.

Method 1300 places a porous facesheet of a pick and place system relative to a sheet of material (operation 1302). Method 1300 provides an air flow between a backing plate and the porous facesheet by a flow generator (operation 1303). Method 1300 directs the air flow within the pick and place system by the backing plate (operation 1304). Method 1300 draws the air flow evenly through the porous facesheet (operation 1305). Method 1300 picks up the sheet of material using the air flow through the porous facesheet (operation 1306). Afterwards, the method terminates.

In some illustrative examples the porous facesheet is one of a plurality of porous facesheets arranged in a facesheet assembly having a hold surface (operation 1308), wherein placing a porous facesheet relative to the sheet of material comprises placing a portion of the hold surface in contact with the sheet of material (operation 1310).

In some illustrative examples, the porous facesheet is one of a plurality of porous facesheets arranged in a facesheet assembly having a hold surface (operation 1308), and drawing the air flow evenly through the porous facesheet comprises pulling flow through a subset of the plurality of porous facesheets (operation 1312). In some illustrative examples, the subset of the plurality of porous facesheets is selected based on at least one of a size or a shape of the sheet of material.

Method 1300 provides support to substantially all of the sheet of material using the hold surface (operation 1314). Substantially all of the sheet of material is supported due to the air flow through the pores of the porous facesheet. The porous facesheet supports a greater amount of the sheet of material than would be supported by a conventional pick and place system with discrete locations such as vacuum cups or a vacuum plate with drilled holes (perforations).

In some illustrative examples, method 1300 localizes the sheet of material on the porous facesheet using a machine vision system to form localized data (operation 1316). The machine vision system identifies the location of the sheet of material on the porous facesheet. In some illustrative examples, the color of fasteners securing the porous facesheet within the pick and place system is selected to aid in localizing the sheet of material by the machine vision system. In some illustrative examples, the fasteners securing the porous facesheet within the pick and place system are color-matched to the porous facesheet to aid in localizing the sheet of material by the machine vision system.

The machine vision system may be machine vision system 120 of FIG. 1 or machine vision system 304 of FIG. 3. The machine vision system locates the picked-up sheet of material relative to the porous facesheet so that the picked-up sheet of material can be located accurately when placed using the pick and place system. Therefore, the picked-up sheet of material is located relative to the porous facesheet of the end effector, effectively indexing it to the end effector so that the end effector location relative to the place position can be calculated and the placement can be accurately made.

In some illustrative examples, method 1300 places the sheet of material in a desired location using the localized data (operation 1318), and ceases the air flow to release the sheet of material from the porous facesheet (operation 1320). The pick and place system places the sheet of material in the desirable location based on positional data, a model of a structure to be formed, and the localized data of the sheet of material on the porous facesheet. The position of the pick and place system within the manufacturing environment is known based on positional inspection. The desired location is a location for the sheet of material to form a structure. The desired location is on prior layers of the structure or on a manufacturing tool. The position of the structure or manufacturing tool in the manufacturing environment is known based on positional inspection.

By ceasing air flow, the sheet of material is placed in the desired location and the pick and place system will move away from the sheet of material. In some illustrative examples, after ceasing the air flow, the air flow is reversed to release the sheet of material from the porous facesheet. In one example, the air flow is initially an air flow towards the flow generator, such as pulling a vacuum. In this example, if the air flow is reversed, a gentle puff of air through the porous facesheet towards the sheet of material will aid in releasing the sheet of material.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operation 1308 through operation 1320 of FIG. 13 may be optional.

Figure 14:
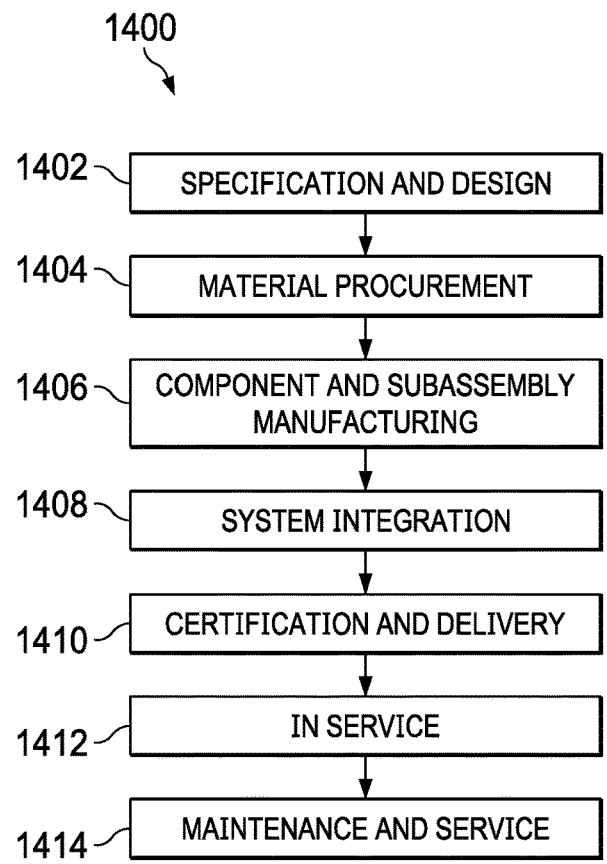
FIG. 14 is an illustration of a block diagram of an aircraft manufacturing and service method in accordance with an illustrative embodiment.
Figure 15:
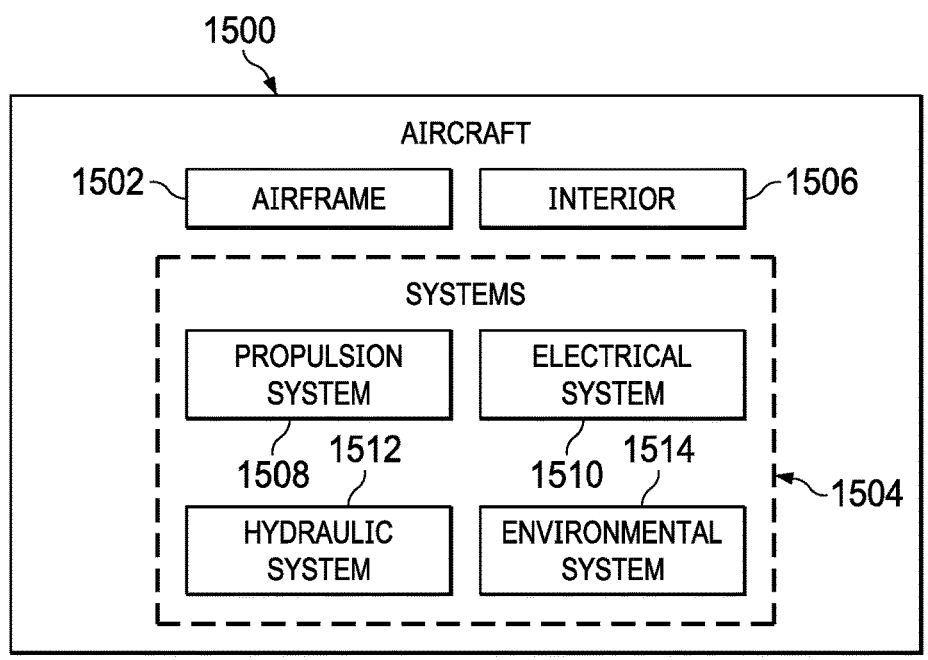
FIG. 15 is an illustration of a block diagram of an aircraft in which an illustrative embodiment may be implemented.

Illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, or other maintenance and service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 of FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included.

Apparatuses and methods embodied herein may be employed during at least one of the stages of aircraft manufacturing and service method 1400. One or more illustrative embodiments may be used during at least one of component and subassembly manufacturing 1406, system integration 1408, or maintenance and service 1414 of FIG. 14. For example, the illustrative examples could be used during component and subassembly manufacturing 1406 to manufacture a component, such as a portion of airframe 1502 or interior 1506 of aircraft 1500. Method 1300 can be used to manufacture a portion of airframe 1502 or interior 1506 of aircraft 1500. As another example, a replacement component or repair may be picked and placed using the illustrative examples during maintenance and service 1414 of FIG. 14.

The illustrative examples provide a pick and place system and method for using that solve the problem of material sagging during transfer by supporting substantially the entire material surface rather than discrete locations as would be typical with a vacuum cup gripping system. The illustrative examples provide an added benefit of holding the sheet of material against the hold surface without sagging for aiding a position compensation step that would be part of a closed loop. The illustrative examples provide a more uniform background for a machine vision problem to identify the fabric boundaries on the hold surface (vacuum pad) backdrop.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A pick and place system comprising:
 a backing plate configured to direct air flow within the pick and place system, the backing plate comprising an internal perimeter surface, baffles, and a surface, wherein the internal perimeter surface surrounds the baffles and the surface, and wherein the internal perimeter surface and the baffles extend from the surface;
 a porous facesheet secured to the backing plate and supported by the baffles and the internal perimeter surface to form a space between the porous facesheet and the surface; and
 a flow generator configured to provide an air flow in the space between the surface of the backing plate and the porous facesheet.

2. The pick and place system of claim 1, wherein the porous facesheet is secured to the backing plate by fasteners countersunk in the porous facesheet, wherein the fasteners are color-matched to the porous facesheet.

3. The pick and place system of claim 1, wherein the baffles are configured to direct the air flow across all of the porous facesheet such that the porous facesheet forms a hold surface devoid of discrete holding points.

4. The pick and place system of claim 1, wherein the baffles are configured to support the porous facesheet against direction of the air flow.

5. The pick and place system of claim 1, wherein the baffles are inset from the internal perimeter surface of the backing plate.

6. The pick and place system of claim 1, wherein edges of the porous facesheet extend past the internal perimeter surface of the backing plate.

7. The pick and place system of claim 1, wherein the porous facesheet comprises a porous polymeric material.

8. The pick and place system of claim 1, wherein the porous facesheet has a pore size in a range of 35 microns to 200 microns.

9. The pick and place system of claim 1, wherein the porous facesheet has a porosity in a range of 35% to 40%.

10. The pick and place system of claim 1, wherein the flow generator is connected to the backing plate.

11. The pick and place system of claim 1, wherein the porous facesheet is formed of an open cell material.

12. The pick and place system of claim 1, wherein the porous facesheet has a curvature mirroring a curvature of a support surface holding a sheet of material to be picked and placed by the pick and place system.

13. A pick and place system comprising:
a plurality of porous facesheets arranged into a facesheet assembly having a hold surface;
a plurality of backing plates configured to distribute air flow through each of the plurality of porous facesheets, each backing plate of the plurality of backing plates comprising an internal perimeter surface, baffles, and a surface, wherein the internal perimeter surface surrounds the baffles and the surface, and wherein the internal perimeter surface and the baffles extend from the surface and support a representative porous facesheet of the plurality of porous facesheets; and
a number of flow generators connected to the plurality of backing plates and configured to provide air flow between the surface of each backing plate of the plurality of backing plates and the representative porous facesheet of the plurality of porous facesheets.

14. The pick and place system of claim 13, wherein each of the number of flow generators is connected to only one backing plate of the plurality of backing plates.

15. The pick and place system of claim 13, wherein at least one flow generator of the number of flow generators is connected to more than one backing plate of the plurality of backing plates.

16. The pick and place system of claim 13, wherein each of the plurality of porous facesheets has a same size and shape, and wherein the facesheet assembly is a tessellation.

17. The pick and place system of claim 13, wherein the pick and place system is an end effector configured to be connected to an automated movement system.

18. The pick and place system of claim 13, wherein the plurality of porous facesheets are secured to the plurality of backing plates by fasteners countersunk in the plurality of porous facesheets, wherein the fasteners are color-matched to the plurality of porous facesheets.

19. A pick and place system comprising:
a plurality of porous facesheets arranged into a facesheet assembly having a hold surface wherein the facesheet assembly is a tessellation;
a plurality of backing plates configured to distribute air flow through each of the plurality of porous facesheets, each backing plate of the plurality of backing plates comprising an internal perimeter surface, baffles, and a surface, wherein the internal perimeter surface surrounds the baffles and the surface, and wherein the internal perimeter surface and the baffles extend from the surface and support a representative porous facesheet of the plurality of porous facesheets to form a space between the porous facesheet and the surface;
a machine vision system identifying boundaries on the hold surface; and
a number of flow generators configured to provide air flow in the space between the surface of each backing plate of the plurality of backing plates and the representative porous facesheet of the plurality of porous facesheets,
wherein the pick and place system is an end effector configured to be connected to an automated movement system.

20. The pick and place system of claim 19, wherein the plurality of porous facesheets are secured to the plurality of backing plates by fasteners countersunk in the plurality of porous facesheets, wherein the fasteners are color-matched to the plurality of porous facesheets.

21. The pick and place system of claim 19, wherein the baffles of each backing plate are inset from the internal perimeter surface of the backing plate.

22. The pick and place system of claim 21, wherein the number of flow generators are connected to the plurality of backing plates and configured to provide the air flow between the surface of each backing plate of the plurality of backing plates and the representative porous facesheet of the plurality of porous facesheets.

23. The pick and place system of claim 19, wherein portions of the hold surface are individually controllable by selectively sending the air flow to each of the plurality of porous facesheets.

\* \* \* \* \*